United States Patent [19]

Sakata

[11] Patent Number: 5,091,943
[45] Date of Patent: Feb. 25, 1992

[54] FM STEREO RECEIVING DEVICE
[75] Inventor: Haruo Sakata, Tokyo, Japan
[73] Assignee: Clarion Co., Ltd, Tokyo, Japan
[21] Appl. No.: 575,131
[22] Filed: Aug. 29, 1990
[30] Foreign Application Priority Data Sep. 14, 1989 [JP] Japan .................................. 1-239356

[51] Int. Cl.[5] .............................................. H04H 5/00
[52] U.S. Cl. ............................................ 381/7; 381/13
[58] Field of Search .......................... 381/7, 13, 4, 3

[56] References Cited

U.S. PATENT DOCUMENTS

| | | | |
|---|---|---|---|
| 4,047,116 | 9/1977 | Ogita | 381/7 |
| 4,216,430 | 8/1980 | Amazawa et al. | |
| 4,244,056 | 1/1981 | Hamada et al. | |
| 4,301,541 | 11/1981 | Tanaka et al. | |
| 4,426,727 | 1/1984 | Hamada | |
| 4,454,607 | 6/1984 | Ogita | 381/13 |
| 4,523,328 | 6/1985 | Kasperkovitz | 381/3 |
| 4,602,381 | 7/1986 | Cugnini et al. | 381/13 |
| 4,682,045 | 7/1987 | Amazawa et al. | |
| 4,701,715 | 10/1987 | Amazawa et al. | |
| 4,862,097 | 8/1989 | Amazawa et al. | |
| 4,899,389 | 2/1990 | Amazawa | |

Primary Examiner—Forester W. Isen
Assistant Examiner—Sylvia Chen
Attorney, Agent, or Firm—Flynn, Thiel, Boutell & Tanis

[57] ABSTRACT

In an FM stereo receiving device according to the present invention, a received first FM-modulated wave is demodulated by means of an FM-demodulator, from the demodulated output of which a subcarrier signal is produced, further a monaural signal is extracted by means of an LPF, and the monaural signal is again FM-modulated by means of a voltage controlled oscillator to obtain a second FM-modulated wave. Then a difference frequency component wave is produced by a multiplication operator and an LPF, starting from the first FM-modulated wave and the second FM-modulated wave and the FM-modulated wave and the difference frequency component wave are switched over with the subcarrier signal by means of a switch circuit. In this way signals of a right ear side component and a left ear side component are obtained and a stereo signal is obtained by FM-demodulating both the signals by means of the FM-demodulator. Consequently, by using the present receiving device, it is possible to suppress influences of noise at the demodulation of the FM-modulated wave at the same degree as the monaural signal and to increase the SN ratio at the reception of the stereo signal in weak electric field.

12 Claims, 6 Drawing Sheets

FM STEREO RECEIVING DEVICE

FIELD OF THE INVENTION

The present invention relates to an improvement of a stereo receiving device for FM broadcast, in which a subcarrier AM-modulated by a stereo signal is superposed on a monaural signal, which serves as a base band signal to obtain an FM-modulated wave.

BACKGROUND OF THE INVENTION

Figure 6:
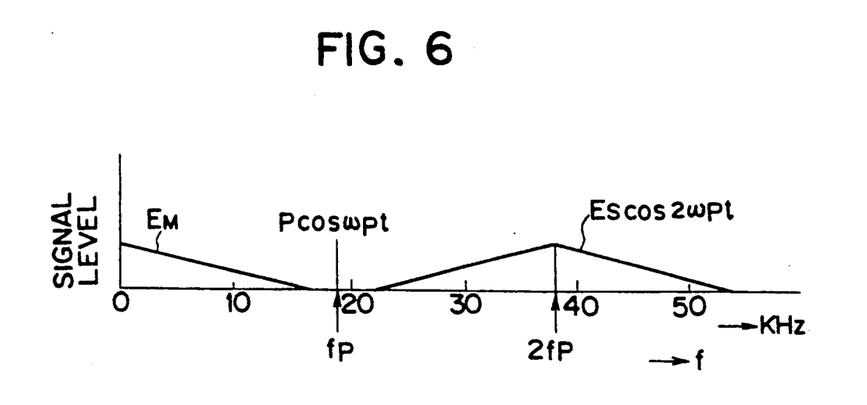
FIG. 6 shows the frequency distribution of a base band signal.

The base band signa $E_B$ for an FM broadcast wave is obtained by adding a modulated signal obtained by amplitude-modulating a subcarrier ($2f_p = 38$ kHz) by a stereo signal $E_S$ to a monaural signal $E_M 0 \sim 15$ kHz, as indicated in FIG. 6, and a carrier is frequency-modulated (FM) by this base band signal $E_B$. Further a sinusoidal wave of $f_p = 19$ kHz is also superposed as a pilot signal on the base band signal $E_B$.

Consequently, the right ear side signal being represented by $E_R$, the left ear side signal by $E_L$, which are fundamental signals, the following relationships are valid:

$$E_M = \tfrac{1}{2}(E_R + E_L) \tag{1}$$

$$E_S = \tfrac{1}{2}(E_R - E_L) \tag{2}$$

$$E_B = E_M + E_S \cos 2\omega_p t + p \cos \omega_p t \tag{3}$$

where $p \cos \omega_p t$ represents the pilot signal. The waveform obtained by removing the pilot signal from the base band signal $E_B$ is indicated in FIG. 5.

Figure 7:
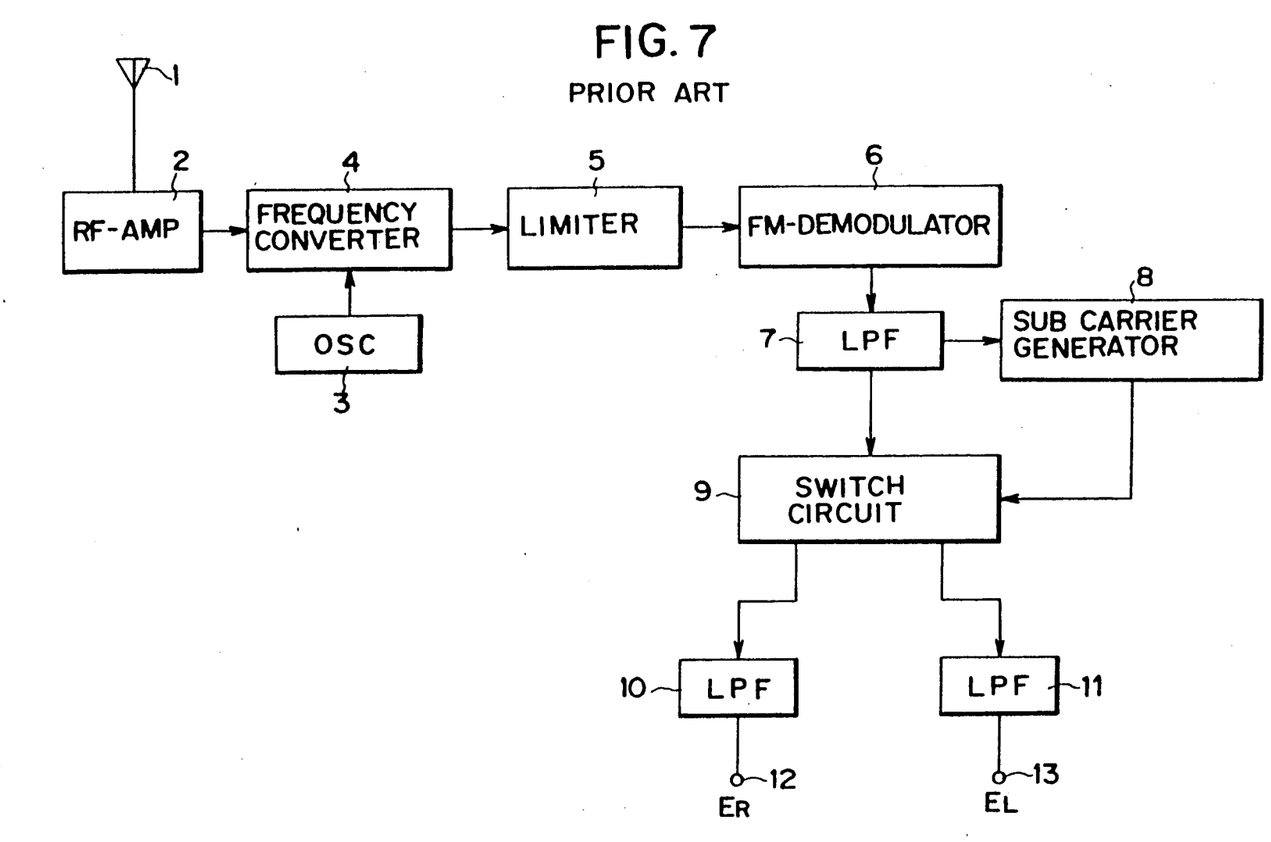
FIG. 7 is a block diagram showing the fundamental construction of a prior art receiver.

FIG. 7 shows the basic construction of a prior art FM stereo receiving device. In the figure, reference numeral 1 is a receiving antenna; 2 is a high frequency amplifier; 3 is a local oscillator; 4 is a frequency converter; 5 is an amplitude limiter; 6 is an FM demodulator; 7 is a pilot separating filter; 8 is a subcarrier generator; 9 is a switch circuit; 10 and 11 are low pass filters (LPF); and 12 and 13 are an $E_R$ and an $E_L$ outputting terminal, respectively.

In the receiver described above, as indicated in FIG. 7, the output of the receiving antenna 1 is high-frequency-amplified by the high frequency amplifier 2 and inputted in the frequency converter 4. In this way a signal representing a frequency difference between the high-frequency-amplified signal and the output of the local oscillator 3 is outputted by the frequency converter 4. This signal is called the IF (intermediate frequency) signal (frequency $f_{10} \approx 10.7$ MHz). Since it is an FM modulated wave, the level thereof can be limited to a certain constant value by the amplitude limiter 5. The output of the amplitude limiter 5 is demodulated by the FM demodulator 6 to obtain the base band signal ($E_B$ in Equation (3)). The pilot signal $f_p = 19$ kHz is taken out from this base band signal by the pilot separating filter 7, which pilot signal is inputted in the subcarrier generator 8 (for which a PLL circuit, etc. are used) to generate the subcarrier $\cos 2\omega_p t$. In this way the switch circuit 9 is switched. The other output of the pilot separating filter 7 is a wave, from which the pilot signal $f_p = 19$ kHz ($p \cos \omega_p t$ in Equation (3)) is removed. Since this is given by $E_M + E_S \cos 2\omega_p t$, this is inputted in the switch circuit 9, which is switched by the output $\cos 2\omega_p t$ of the subcarrier generator 8. At point A in FIG. 5(a), since $\cos 2\omega_p t = -1$, the right ear side signal $E_R$ is obtained. On the other hand at point B in FIG. 5(a), since $\cos 2\omega_p t = -1$, the left ear side signal $E_L$ is obtained.

Since the output of the switch circuit 9 is a pulse train, $E_R$ and $E_L$ are taken out by means of the low pass filters 10 and 11, which are sent to the output terminals 12 and 13, respectively.

Although FIG. 7 is a scheme of the construction representing the principle, this is utilized in practice exclusively with an extremely simple construction.

Figure 2:
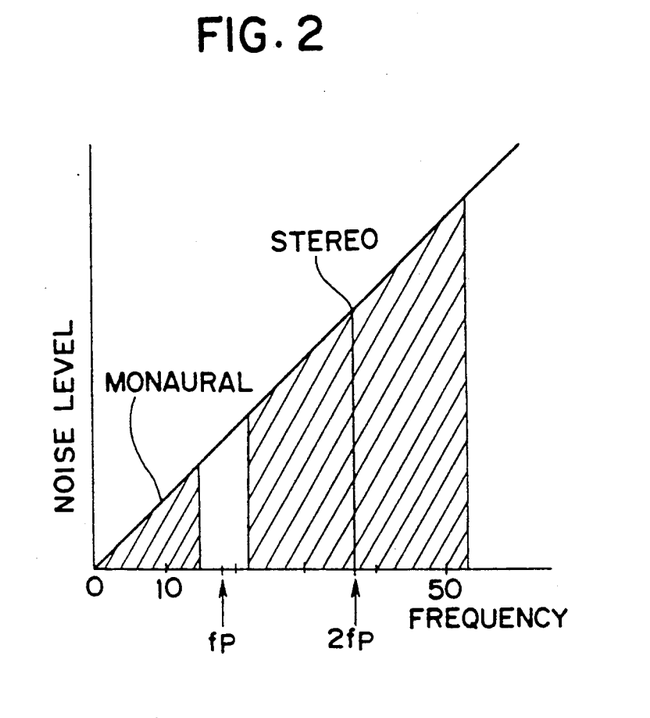
FIG. 2 is a scheme indicating the noise distribution at the FM demodulation.

However the signal FM-demodulated by the FM demodulator 6 indicated in FIG. 7 generates triangular noise having a noise distribution in the base band, as indicated in FIG. 2, which increases proportionally to the frequency of the base band, peculiar to the FM modulation method.

Consequently, because of the triangular noise increasing at high frequencies, as indicated in FIG. 2, the SN ratio differs considerably for $E_M$ (monaural) below 15 kHz and the stereo signal of 38 kHz$\pm$15 kHz. Therefore the SN ratio of the stereo signal was lowered significantly with respect to the SN ratio of the monaural signal.

Because of this lowering in the SN ratio of the stereo signal, there was a problem that the service area of the stereo broadcast was restricted. That is, the prior art receiver indicated in FIG. 7 had a drawback that the SN ratio is worsened when receiving the stereo channel $E_S$ in a weak electric field.

OBJECT OF THE INVENTION

The object of the present invention is to provide an FM stereo receiving device, by which the SN ratio of the stereo channel $E_S$ is not worsened even at the weak electric field reception.

SUMMARY OF THE INVENTION

In order to achieve the above object, an FM stereo receiving device according to the present invention comprises monaural signal extracting means for FM-demodulating a received first FM-modulated signal to extract a monaural signal; modulating means for FM-modulating the monaural signal stated above to obtain a second FM-modulated signal; difference frequency component outputting means for obtaining a signal of a difference frequency component between the second FM-modulated signal and the first FM-modulated signal stated above; synchronizing signal generating means for extracting a pilot signal from the first FM-modulated signal to generate a synchronizing signal on the basis of the signal stated above; switching means for obtaining a first signal and a second signal by switching the first FM-modulated signal and the difference frequency component signal, responding to the synchronizing signal; and demodulating means for demodulating the first and the second signal stated above to obtain a right ear side signal $E_R$ and the left ear side signal $E_L$, respectively.

Figure 3A:
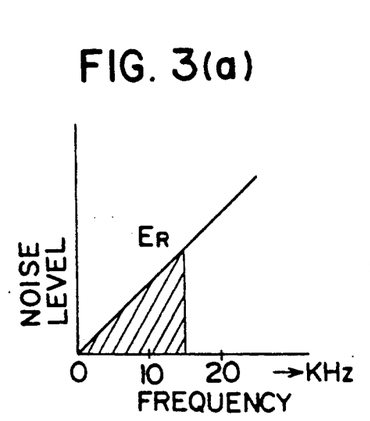
FIGS. 3(a) and 3(b) are a scheme indicating a target of the noise distribution.
Figure 3B:
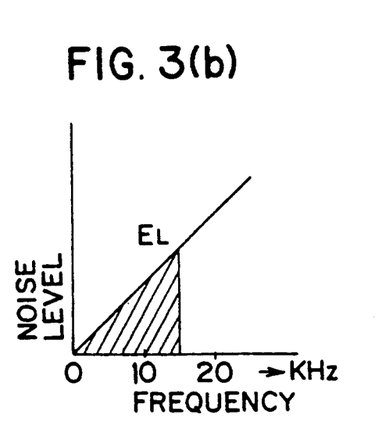

When the receiver is constructed as described above according to the present invention, since it is possible to maintain the SN ratio of the right ear side signal and the left ear side signal approximately at the same degree as that of the monaural signal by modifying the circuit of the receiver without modifying the signal form on the transmitter side of the FM stereo broadcast, it is possible to enlarge the service area receiving the stereo broadcast. That is, conceptually the noise distribution of the prior art method indicated in FIG. 2 is reduced to noise of approximately same degree as that of monaural also for the right and left ear side signals $E_R$ and $E_L$ as indicated in FIG. 3 and thus the stereo receiving area, can be enlarged.

DETAILED DESCRIPTION

Figure 1:
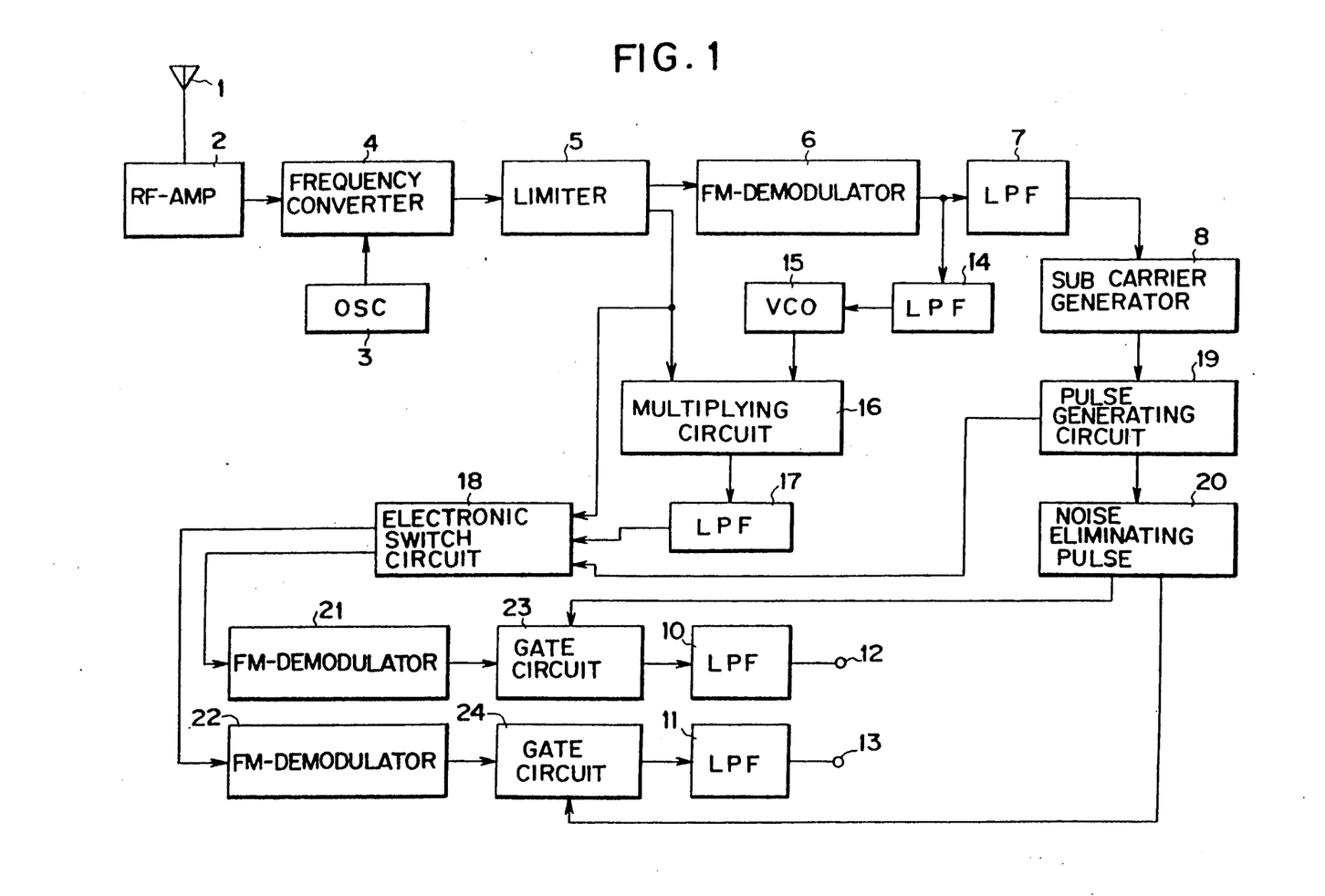
FIG. 1 is a block diagram showing the construction of an FM stereo receiving device according to the present invention.

FIG. 1 is a block diagram showing the construction of an embodiment of the FM stereo receiving device according to the present invention, in which the reference numerals, which are used in common in FIG. 7, represent items identical or corresponding to those indicated in igure 7; 14 is a low pass filter ($E_M$ separation); 15 is a voltage controlled oscillator (VCO) (FM modulation: $2f_{io}$); 16 is a multiplying circuit; 17 is a low pass filter ($f_{io}$); 18 is an electronic switch circuit; 19 is a subcarrier ($2f_p$ pulse) generator; 20 is a noise removing pulse generator; 21 and 22 are FM demodulators; 23 and 24 are gate circuits.

That is, the monaural signal extracting means consists of the FM demodulator 6 and the low pass filter 14 stated above; the modulating means is composed of the voltage controlled oscillator (VCO) 15 stated above; and the difference component outputting means consists of the multiplying circuit 16 and the low pass filter 17 stated above.

Further the synchronizing signal generating means consists of the pilot separating filter 7, the subcarrier oscillator 8 and the $2f_p$ pulse generating circuit 19; the switching means is composed of an electronic switcher 18; and the demodulating means consists of the noise removing pulse generator 20, the FM demodulators 21 and 22, and the gate circuits 23 and 24.

FIG. 5 shows waveforms of signals in various parts in the circuit indicated in FIG. 1.

Hereinbelow the operation of the embodiment described above will be explained.

Figures 5A, 5B, 5C:
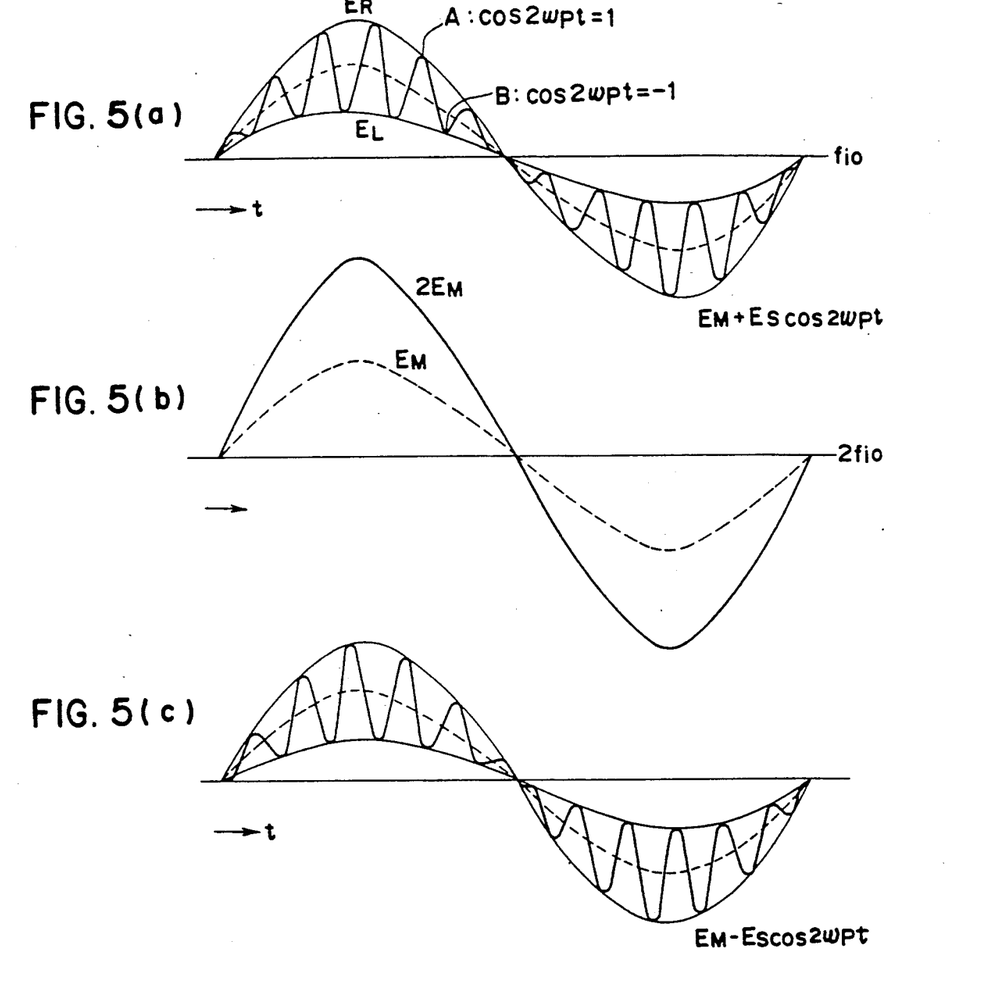
FIGS. 5(a) through 5(j) shows waveforms of signals at various parts of the circuit indicated in FIG. 1.
Figure 5D:
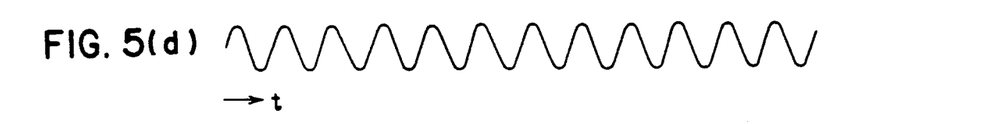
Figures 5E, 5F:
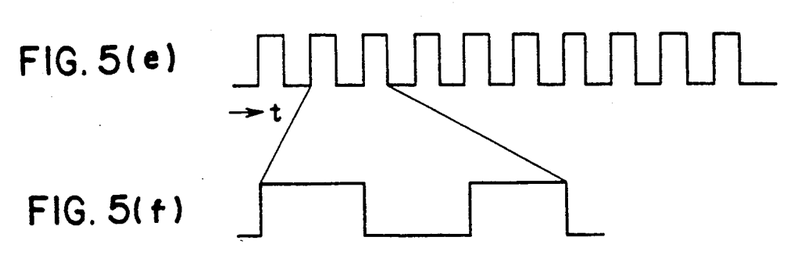
Figure 5G:
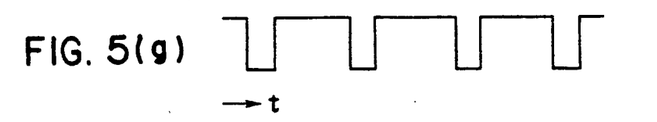

In the device described above, in principle, the FM-modulated wave, whose base band signal $E_B$ is given by Equation (3), is obtained in the frequency converter 4 and the frequency (IF) thereof is $f_{io}$ FIG. 5(a) indicates the waveform thereof.

The FM modulated wave indicated in FIG. 5(a) is FM-demodulated and the monaural signal $E_M$ component is taken out. Then, when the $2f_{io}$ signal is FM-modulated with a $2E_M$ signal, a signal indicated by the full line in FIG. 5(b) is obtained. Here the ordinate in each of the graphs (a), (b) and (c) represents the frequency. When the difference frequency signal is taken out by operating in the frequency the signals indicated in FIG. 5(a) and (b), a signal in FIG. 5(c) is obtained. The signals indicated in FIG. 5(a) and (c) are base band signals, in which $E_M$ is common and $E_S \cos 2\omega_p t$ is in the phases opposite to each other. The signals indicated in (a) and (c) in the same figure are switched over by $\cos 2\omega_p t$ indicated in FIG. 5(d).

That is, when the signal indicated in FIG. 5(a) is switched over by $\cos 2\omega_p t = 1$ and that indicated in (c) in the same figure by $\cos 2\omega_p t = -1$ to be taken out, the FM-modulated wave, whose base band is $E_R$, is obtained. On the contrary, when the signal indicated in FIG. 5(a) is switched over $\cos 2\omega_p t = -1$ and that indicated in (c) in the same figure by $\cos 2\omega_p t = 1$ to be taken out, the FM-modulated wave, whose base band is $E_L$, is obtained. Pulse indicated in FIG. 5(e) and (f) are generated by inputting the FM-demodulated wave outputted by the FM demodulator 6 in FIG. 1 in the $2f_p$ pulse generator 19 through the pilot separating filter 7 and the $\cos 2\omega_p t$ generating circuit 8, which pulses control the switching of the switch circuit 18. On the other hand, the monaural signal $E_M$ below 15 kHz in FIG. 6 is separated from the FM-demodulated wave outputted by the FM demodulator 6 by means of the low pass filter 14 and this monaural signal $E_M$ is again FM-modulated by the voltage controlled oscillator (VCO) 15. The central frequency (not modulated wave) of the VCO 15 is $2f_{io}$. The output of the VCO 15 is an FM-modulated wave FM-modulated with $E_M$ in reference to $2f_{io}$. The output of the amplitude limiter 5 is multiplied by the output of the VCO 15 in the multiplying circuit 16 and the difference frequency component thereof is taken out through the low pass filter 17. The output of the low pass filter 17 is the difference frequency component between (a) and (b) in FIG. 5, which is as indicated in FIG. 5(c). The base band signal of the low pass filter 17 is given by:

$$E_M - E_S \cos 2\omega_p t.$$

$E_M - E_S \cos 2\omega_p t$, which is the output of the multiplying circuit 16, and $E_M + E_S \cos 2\omega_p t$, which is the output of the amplitude limiter 5, can be taken out by the electronic switch circuit 18, while switching over them, so as to obtain the FM-modulated wave, whose base band signal is $E_R$, and the FM-modulated wave, whose base band signal is $E_L$, at the output of the electronic switcher 18.

That is, when the signals indicated in (a) and (c) in FIG. 5 are switched over, the FM-modulated wave indicated by the full line in (h), whose base band is $E_R$, and the FM-modulated wave indicated by the broken line, whose base band is $E_L$, are obtained.

Figure 5H:
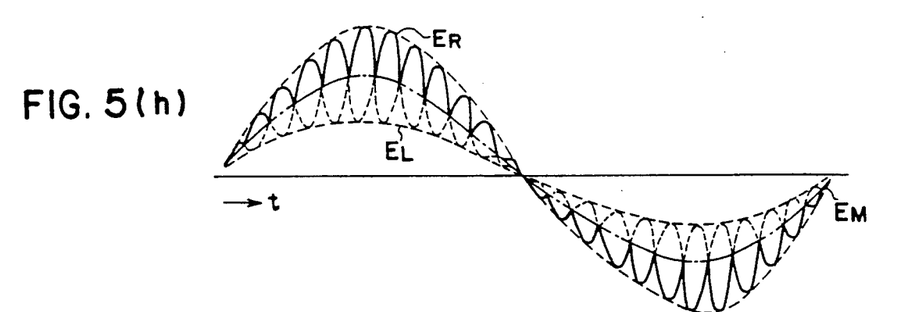
Figure 5I:
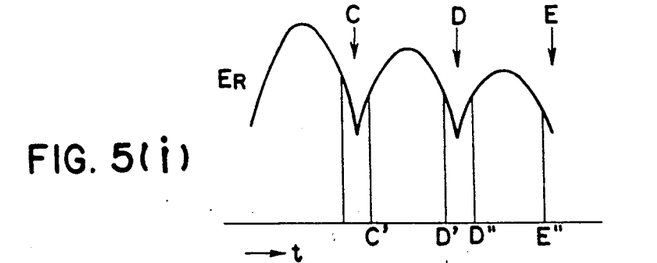
Figure 5J:
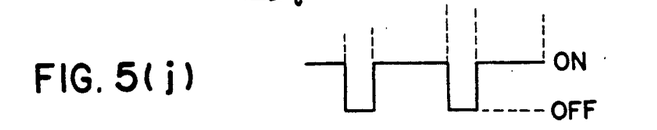

In order to simplify the explanation, the pilot signal $p \cos \omega_p t$ is omitted. Here the right and left ear side signals $E_R$ and $E_L$ indicated in FIG. 5(h) are the outputs of the FM demodulators 21 and 22, respectively. Pulses (g) masking the switch time of the electronic switch circuit 18 for the signals (e) and (f) in FIG. 5, which are the outputs of the $2f_p$ pulse generator 19, are generated by the noise removing pulse generator 20, and the gate circuit 23 and 24 are turned on/off by these pulses. As indicated in FIG. 5(i), since noises due to the discontinuity in the phase of the IF signal described above are produced at the portions of switch points C, D, E, ... by the fact that the right ear side signal $E_R$ is switched by pulses coming from the $2f_p$ pulse generator 19, these noises are removed by turning on/off the gate circuits 23 and 24 by using pulses indicted in FIG. 5(g). As the result, between C' and D', D" and E", ..., the right and left ear side signals $E_R$ and $E_L$ having the same SN ratio as the monaural signal $E_M$ are obtained and unnecessary high frequency wave indicated in (i) in the same figure is removed by the low pass filters 10 and 11.

Figures 4A, 4B, 4C, 4D:
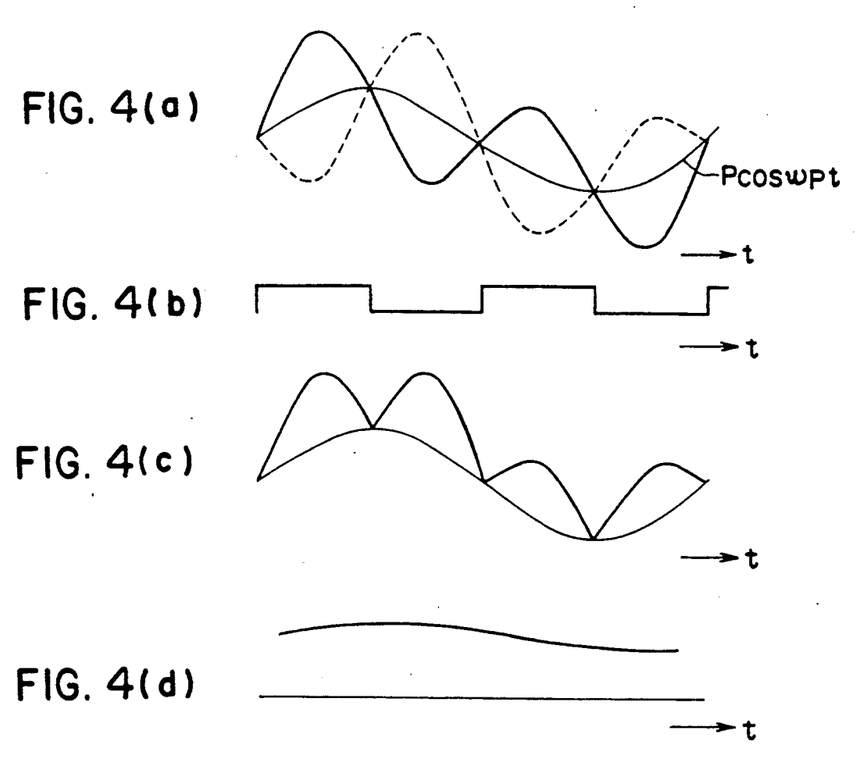
FIGS. 4(a) through 4(d) show waveforms, when there is a pilot signal.

Further, although the pilot signal is not mentioned in the above explanation, the pilot signal (19 kHz) is removed by the final low pass filters (0.15 kHz) 10 and 11. Taking the case where the output of low pass filter 14 is expressed by $E_M + p\cos\omega_p t$, indicated in FIG. 4, as an example where the pilot signals is contained, the inputs in the electronic switch circuit 18 are the signal indicated by the broken line (output of the low pass filter 17) and that indicated by the full line (output of the amplitude limiter 5) in FIG. 4(a). When these are switched over by using the output of the $2f_p$ pulse generator 19 $\cos 2\omega_p t$ indicated in (b), the output of the electronic switch circuit 18 is the FM-modulated wave, whose base band is (c) in FIG. 4. When this is FM-demodulated and taken out through a low pass filter (0~15 kHz), the right ear side signal $E_R$ indicated in FIG. 4(d) is obtained and the pilot signal is removed.

As explained above, according to the present invention, it is possible to suppress the influences of the triangular noises, which increases with the increasing frequency of the base band at demodulating the FM-modulated wave at the same degree as the monaural signal. Further it is possible to suppress also noises due to the discontinuity in the phase of the carrier. For this reason the SN ratio at the reception of the stereo signal can be kept at the same degree of the SN ratio of the monaural signal, which makes the stereo reception at weak electric field possible. Furthermore, also in the case where an FM stereo broadcast is received by a moving receiver, the present invention has an effect for the reception at weak electric field produced intermittently due to multi-path, etc. and thus reception with a good SN ratio can be realized always by stereo reception.

What is claimed is:

1. An FM stereo receiving device comprising:
   monaural signal extracting means for extractign a monaural signal from a first FM-modulated signal obtained by FM-demodulating a received FM-modulated signal;
   modulating means for FM-modulating said monaural signal to obtain a second FM-modulated signal;
   difference frequency component outputting means for outputting a difference frequency component signal in response to said first FM-modulated signal and said second FM-modulated signal;
   synchronizing signal generating means for extracting a pilot signal $f_p$ from said first FM-modulated signal to generate a synchronizing signal on the basis of said pilot signal $f_p$;
   switching means for obtaining a first signal and a second signal by switching said first FM-modulated signal and said difference frequency component signal in response to said synchronizing signal; and
   demodulating means for demodulating said first signal and said second signal to obtain a stereo signal consisting of a right ear side signal and a left ear side signal.

2. An FM stereo receiving device according to claim 1, wherein said monaural signal extracting means includes an FM demodulator for FM-demodulating said first FM-modulated signal; and a low pass filter for extracting the monaural signal from the output signal of said FM demodulator.

3. An FM stereo receiving device according to claim 1, wherein said modulating means includes a voltage controlled oscillator which FM-modulates said monaural signal to output an FM-modulated wave of intermediate frequency component.

4. An FM stereo receiving device according to claim 1, wherein said synchronizing signal generating means inclduse a pilot signal separating filter for extracting the pilot signal $f_p$ from said first FM-modulated signal; a subcarrier generator for outputting a signal of subcarrier component on the basis of said pilot signal $f_p$; and a $2\cdot f_p$ signal generator for outputting a signal of $2\cdot f_p$ component having a frequency twice has high as the pilot signal in response to said signal of subcarrier component; wherein said signal of $2\cdot f_p$ component is synchronized with said signal of subcarrier component and is outputted in response to said pilot signal.

5. An FM stereo receiving device according to claim 1, wherein said difference frequency component outputting means includes a multiplier for performing a multiplication of said first FM-modulated signal by said second FM-modulated signal; and a low pass filter for outputting a signal of difference frequency component in response to the output signal of said multiplier.

6. An FM stereo receiving device according to claim 1, wherein said demodulating means includes a pulse signal outputting circuit into which a signal of $2\cdot f_p$ component having a frequency twice as high as the pilot signal $f_p$ is inputted and which outputs a pulse signal for removing switching noise on the basis of said signal of $2\cdot f_p$ component; and gate circuits for removing switching noise contained in said right ear side signal and said left ear side signal by means of said switching means in response to said pulse signal.

7. An FM stereo receiving device according to claim 1, wherein said monaural signal extracting means includes an FM demodulator for FM-demodulating said first FM-modulated signal, and a low pass filter for extracting the monaural signal from the output signal of said FM demodulator;
   wherein said modulating means includes a voltage controlled oscillator which FM-modulates said monaural signal to output an FM-modulated wave of intermediate frequency component; and
   wherein said synchronizing signal generating means includes a pilot signal separating filter for extracting the pilot signal $f_p$ from said first FM-modulated signal, a subcarrier generator for outputting a signal of subcarrier component on the basis of said pilot signal $f_p$, and a $2\cdot f_p$ signal generator for outputting a signal of $2\cdot f_p$ component having a frequency twice as high as the pilot signal in response to said signal of subcarrier component, wherein said signal of $2\cdot f_p$ component is sychronized with said siganl of subcarrier component and is outputted in response to said pilot signal.

8. An FM stereo receiving device according to claim 1, wherein said modulating means includes a voltage controlled oscillator which FM-modulates said monaural signal to output an FM-modulated wave of intermediate frequency component; and
   wherien said synchronizing signal generating means includes a pilot signal separating filter for extracting the pilot signal $f_p$ from said first FM-modulated signal, a subcarrier generator for outputting a signal of subcarrier component on the basis of said pilot signal $f_p$, and a $2\cdot f_p$ signal generator for oututting a signal of $2\cdot f_p$ component having a frequency twice as high as the pilot signal in response to said signal of subcarrier component, wherein said signal of $2\cdot f_p$ component is synchronized with said signal of subcarrier component and is outputted in response to said pilot signal.

9. An FM stereo receiving device according to claim 1, wherein said monaural signal extracting means includes an FM demodulator for FM-demodulating said first FM-modulated signal, and a low pass filter for extracting the monaural signal from the output signal of said FM demodulator;

wherein said modulating means includes a voltage controlled oscillator which FM-modulates said monaural signal to output an FM-modulated wave of intermediate frequency component;

wherien said synchronizing signal generating means includes a pilot signal separating filter for extracting the pilot signal $f_p$ from said first FM-modulated signal, a subcarrier generator for outputting a signal of subcarrier component on the basis of said pilot signal $f_p$, and a $2 \cdot f_p$ signal generator for oututting a signal of $2 \cdot f_p$ component having a frequency twice as high as the pilot signal in response to said signal of subcarrier component, wherein said signal of $2 \cdot f_p$ component is synchronized with said signal of subcarrier component and is outputted in response to said pilot signal; and wherein said difference frequency component outputting means includse a multplier for performing a multiplication of said first FM-modulated signal by said second FM-modulated signal, and a low pass filter for outputting a signal of difference frequency component in response to the output signal of said multiplier.

10. An FM stereo receiving device according to claim 1, wherien said monaural signal extracting means includes an FM demodulator for FM-demodulating said first FM-modulated signal, and a low pass filter for extracting the monaural signal from the output signal of said FM demodulator;

wherein said modulating means includes a voltage controlled oscillator which FM-modulates said monaural signal to output an FM-modulated wave of intermediate frequency component; and wherein said difference frequency component outputting means includes a multiplier for performing a multiplication of said first FM-modulated signal by said second FM-modulated signal, and a low pass filter for outputting a signal of difference frequency component in response to the output signal of said multiplier.

11. An FM stereo receiving device according to claim 1, wherein said monaural signal extracting means includes an FM demodulator for FM-demodulating said first FM-modulated signal, and a low pass filter for extracting the monaural signal from the output signal of said FM demodulator;

wherein said modulating means includes a voltage controlled oscillator which FM-modulates said monaural signal to output an FM-modulated wave of intermediate frequency component;

wherien said synchronizing signal generating means includes a pilot signal separating filter for extracting the pilot signal $f_p$ from said first FM-modulated signal, a subcarrier generator for outputting a signal of subcarrier component on the basis of said pilot signal $f_p$, and a $2 \cdot f_p$ signal generator for oututting a signal of $2 \cdot f_p$ component having a frequency twice as high as the pilot signal in response to said signal of subcarrier component, wherein said signal of $2 \cdot f_p$ component is synchronized with said signal of subcarrier component and is outputted in response to said pilot signal; and wherein said difference frequency component outputting means includse a multplier for performing a multiplication of said first FM-modulated signal by said second FM-modulated signal, and a low pass filter for outputting a signal of difference frequency component in response to the output signal of said multiplier.

12. An FM stereo receiving device according to claim 1, wherein said difference frequency component outputting means includes a multiplier for performing a multiplication of said first FM-modulated signal by said second FM-modulated signal, and a low pass filter for outputting a signal of difference frequency component in response to the output signal of said multiplier;

wherien said synchronizing signal generating means includes a pilot signal separating filter for extracting the pilot signal $f_p$ from said first FM-modulated signal, a subcarrier generator for outputting a signal of subcarrier component on the basis of said pilot signal $f_p$, and a $2 \cdot f_p$ signal generator for oututting a signal of $2 \cdot f_p$ component having a frequency twice as high as the pilot signal in response to said signal of subcarrier component, wherein said signal of $2 \cdot f_p$ component is synchronized with said signal of subcarrier component and is outputted in response to said pilot signal; and wherein said modulating means includes a voltage controlled oscillator which FM-modulates said monaural signal to output an FM-modulated wave of intermediate frequency component.

* * * * *